Patented Mar. 13, 1923.

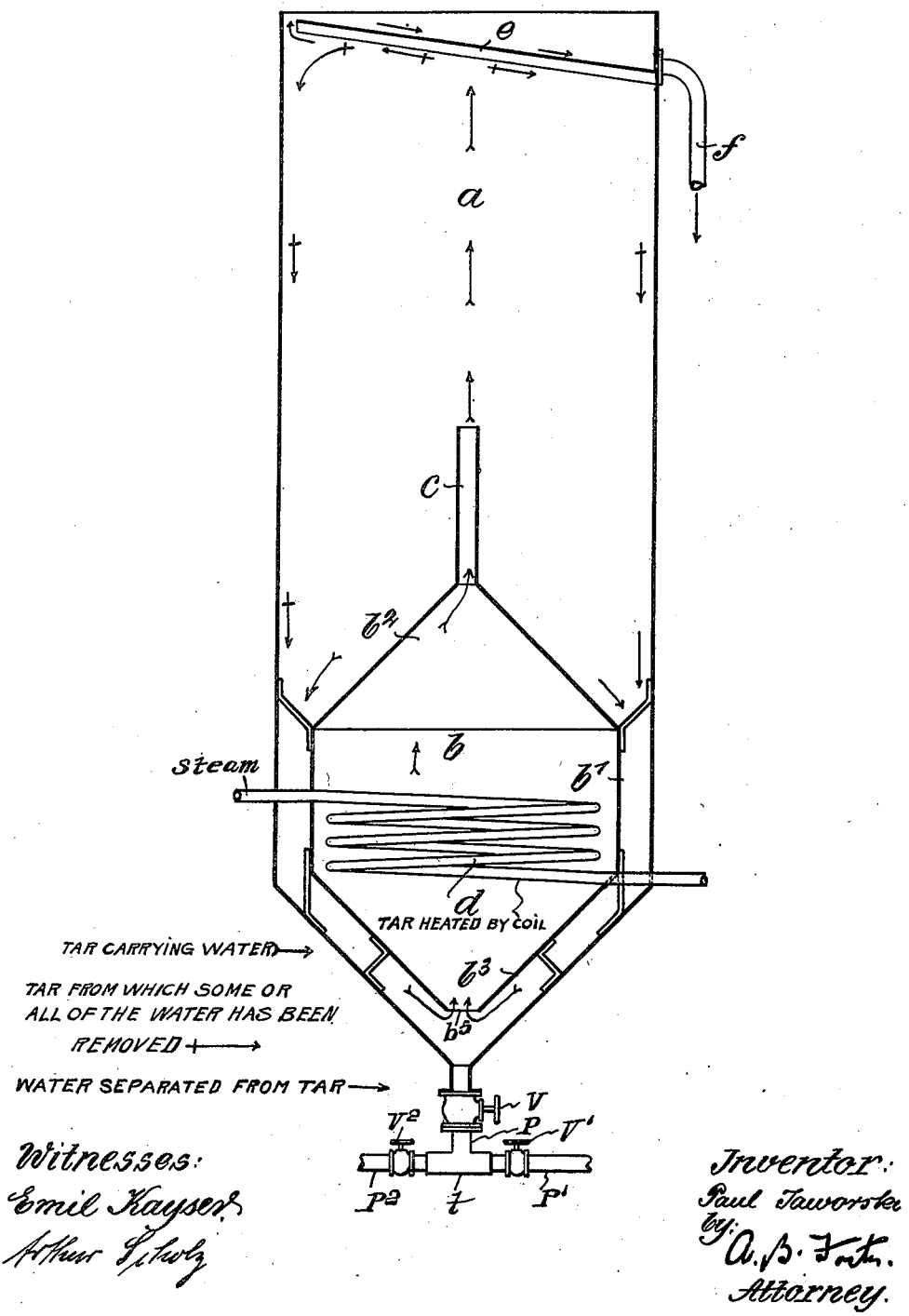

1,448,593

UNITED STATES PATENT OFFICE.

PAUL JAWORSKI, OF BISMARCKHUTTE, GERMANY.

METHOD AND APPARATUS FOR SEPARATING WATER FROM COAL TAR.

Application filed August 26, 1921. Serial No. 495,562.

*To all whom it may concern:*

Be it known that I, PAUL JAWORSKI, a citizen of Prussia, residing at Bismarckhutte, Upper Silesia, Germany, have invented certain new and useful Improvements in Methods and Apparatus for Separating Water from Coal Tar, for which I have filed an application in Germany on May 6, 1920, also an application for patent in Austria on April 30, 1921, an application for patent in France on May 3, 1921, an application for patent in Belgium on May 6, 1921, an application for patent in Great Britain on May 6, 1921, an application for patent in Poland on April 21, 1921, and an application for patent in Czechoslovakia on May 3, 1921, and of which the following is a specification.

This invention relates to a method of and apparatus for separating water from coal tar in which it is finely distributed.

According to the present invention, the coal tar is projected upwardly in a stream so as to impinge against a separating surface, so that the water carried with the continuously projected stream of tar is mechanically separated therefrom.

The improved method is preferably carried out in an apparatus which is adapted to create a circulation of the tar in such a manner that the tar is projected upwardly against a transverse separating plate or baffle.

In order that the invention may be more clearly understood, reference is hereinafter made to the accompanying drawing, showing diagrammatically in vertical section one construction of the apparatus, by way of example, for carrying out the method according to the present invention.

The apparatus comprises a separator or vessel $a$ preferably cylindrical and formed with a conical bottom, the vessel being of substantially greater height than transverse dimensions (e. g. diameter). The height of the vessel may be two and one half to three times its diameter. In the lower end of the vessel is fitted a tar heater $b$ which comprises a cylindrical portion $b^1$ and a conical upper portion $b^2$, with or without an upwardly projecting outlet tube $c$. The tar container $b$ is preferably also formed with a conical bottom $b^3$ to correspond with the conical bottom of the vessel $a$. The conical or other suitably shaped bottom $b^3$ of the vessel $b$ is open at its lower end at $b^5$ into the vessel $a$ and the upper conical portion $b^2$ or outlet tube $c$ is open at its top to the vessel $a$ so that, when the vessel $a$ is filled to or just above the top of baffle $e$, the contents of the tar container $b$ communicate with the contents of the vessel $a$. The container $b$ is fitted with a heating coil $d$ or like means for heating the container and the upper end of the vessel $a$ is fitted with a preferably inclined transverse separating plate $e$ which is preferably spaced at its upper edge as shown from the vessel $a$. Above the lower end of the transverse plate $e$, the vessel $a$ may be provided with a drain pipe $f$.

The method of operation of the apparatus is as follows.

The tar containing water which is to be dehydrated can be run in through valved pipe $p'$, valves $v$ and $v'$ being open, and valve $v^2$ being closed. The pipe $p$ at the bottom of the tapered part of the bottom of tank $a$ has a valve $v$. This pipe may be connected to a T-pipe $t$, to the two ends of which are connected a supply pipe $p'$ and an exit pipe $p^2$, or a wholly separate pipe may enter the tank $a$, at any suitable point for admitting the tar to be treated.

The tar contained in the tar container $b$ is heated by means of the heating coil $d$ and thus given a considerable upward tendency so that a stream of tar is projected upwardly through the tube $c$ with a sufficient velocity to impinge against the separating plate $e$, whereupon the water carried with the tar is separated therefrom (as liquid water) and adheres to the under surface of the plate $e$, travelling upwardly along the same until it creeps over the upper edge thereof and flows down the upper surface of the plate $e$, whilst the tar from which the water has been separated gradually flows back again and is distributed over the whole of the interior of the vessel.

Practical experience has shown that satisfactory results are obtained when the tar is heated to a temperature of 50 to 65 degrees C. In the course of twenty to twenty-four hours the water contained in the tar was, in a particular run of the process, reduced to about three to four per cent, which is generally admitted to be sufficient for all practical purposes.

When sufficiently dehydrated the tar can be run out by opening valves $v$ and $v^2$. The pipe $p^2$ will conduct the treated tar to a storage vessel or elsewhere.

Claims:

1. A method of separating water from coal tar heavier than water which consists in projecting a stream of tar containing fine suspended particles of water, upwardly so as to impinge against a separating surface.

2. A method according to claim 1 in which the stream impinges against the surface at an angle of nearly ninety degrees, so that the water will travel along its surface.

3. A process which comprises establishing a column of tar carrying finely divided particles of water distributed throughout the same, keeping such column of tarry material in the form of a plurality of bodies which are in communication with each other at their upper and lower parts, heating one of such bodies sufficiently to reduce the specific gravity thereof, but not sufficiently to boil the water, and allowing the heated current of tarry material thereby produced, to impinge against a baffle.

4. Apparatus for separating water from coal tar comprising a vessel of substantially greater length than transverse dimensions, a tar heater in the lower end of said vessel and open at its upper and lower parts thereinto, heating means associated with said heater and a transverse plate superposed above said container in the upper end of said vessel.

5. Apparatus as specified in claim 4 in which the plate is slightly inclined and spaced at its upper edge from said vessel.

6. Apparatus as specified in claim 4 in which the tar heater has a conical upper portion and central outlet aperture.

7. Apparatus as specified in claim 4 in which the tar heater has a conical upper portion and upwardly projecting outlet tube.

PAUL JAWORSKI.